July 16, 1946. C. WITTENMYER 2,404,264
POSTING MACHINE
Filed Jan. 27, 1945 2 Sheets-Sheet 1
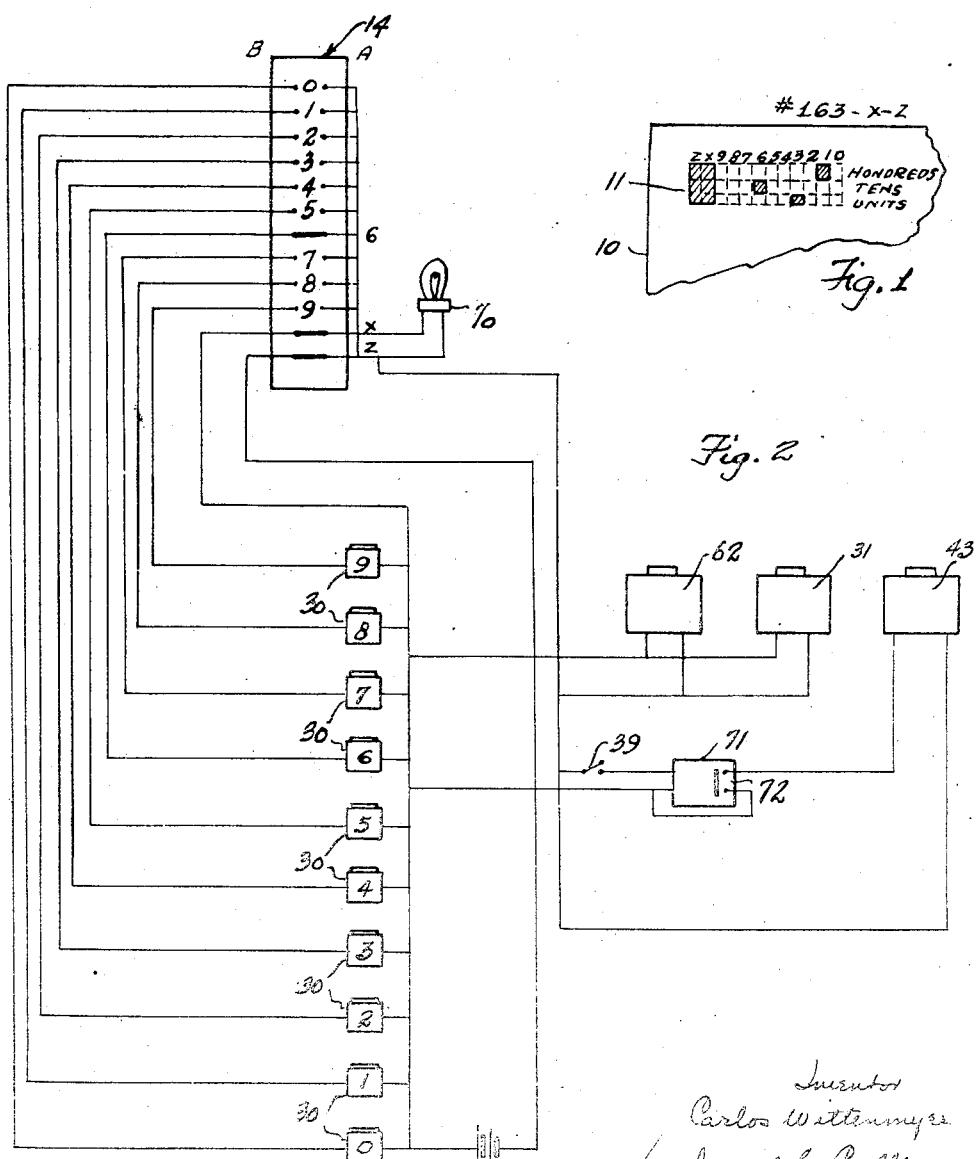

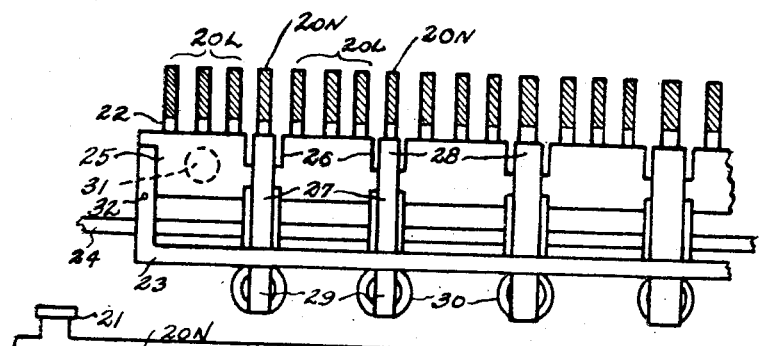
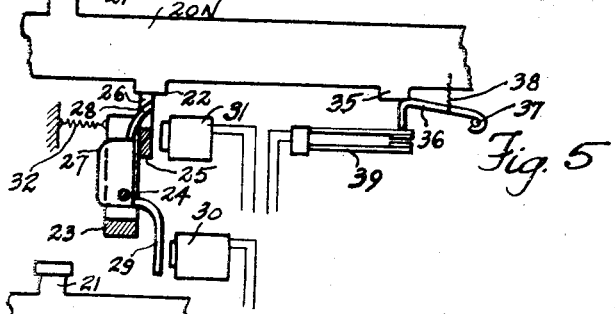
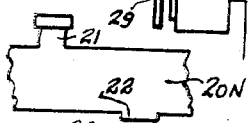
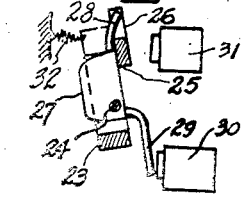
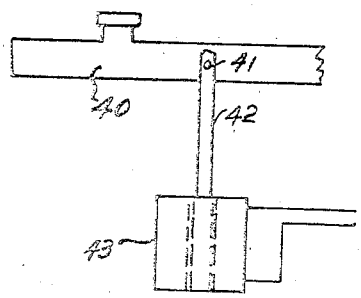
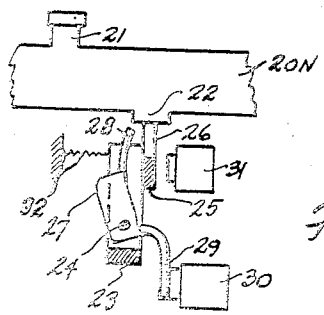

Patented July 16, 1946

2,404,264

UNITED STATES PATENT OFFICE 2,404,264

POSTING MACHINE

Carlos Wittenmyer, Mount Clemens, Mich.

Application January 27, 1945, Serial No. 574,966

1 Claim. (Cl. 197—1)

This application relates to posting machines and aims to provide means to prevent the operator from posting on improperly selected account cards, or, at least, to warn the operator that the account card selected and inserted into the machine is not the proper one.

The machine in which the invention is shown as embodied is a typewriter into which the improvements hereof may be incorporated.

For an understanding of the improvements herein disclosed, reference should be had to the appended drawings.

In these drawings,

Fig. 1 shows a fragment of an account card upon which posting is to be done.

Fig. 2 is a wiring diagram illustrating a circuit and apparatus employed.

Fig. 3 shows an account card reading means.

Fig. 4 shows means for blocking key bars.

Fig. 5 shows a key bar controlled switch for energizing a line spacing or platen and account card advancing means, and also shows the key bar blocking means in another view from that of Fig. 4.

Figs. 6 and 7 show the key bar blocking means in the view of Fig. 5 but in different positions from that of Fig. 5.

Fig. 8 shows a line spacing or platen and account card advancing means.

Fig. 9 shows a means for blocking type bars.

A typewriter comprises a row of key bars, each having a key or button thereon, and each connected to a type bar which may be moved by the key bars towards the platen upon which an account card may be rolled. Normally, when a key bar is pressed down by pressing down on the key, the corresponding type bar is moved towards the platen.

In addition, a typewriter has a line spacing or platen advance means which is connected to a ratchet means for advancing or rotating the platen so that when it is moved it causes the platen to rotate one step and thus to advance an account card on the platen one row or line.

It is to a typewriter answering the above description that the improvements hereof are intended to be added. These improvements will now be described. Before doing so, however, reference is made to Fig. 1 which shows a fragment of an account card 10 having designations in the form of punchings 11 arranged in rows or lines to denote hundreds, tens, and units, with each row or line containing spaces zero to 9, X, and Z, for punchings. The punchings X and Z are control designations, whereas the punchings 0–9 are account designations. The card illustrated is punched to denote that it is for account #163. All account cards will be punched to denote their respective account numbers. In addition all account cards will have three punchings in space X for the three rows or lines, and three punchings in space Z for the three rows or lines.

The typewriter has an account card reader shown diagrammatically at 14 in Fig. 2 and structurally in Fig. 3. The reader consists of a section A having a plurality of contacts zero to 9, X, and Z, and a section B whose contacts are engaged by whatever contacts of section A are permitted to pass through the punchings of the card 10 inserted in the reader, between sections A and B. In the illustration shown, punching 6 in the tens row or line, and punchings X and Z in the same row or line are then being read.

Fig. 4 shows a typewriter key bar 20 which is representative of all of the typewriter key bars that are connected to type bars, both letters and figures. Both the letter key bars 20L and the numeral key bars 20N have keys or buttons 21 whereby they may be pressed down, when permitted to do so by the nonalignment of stop lugs 22 thereof with the upper edges of a stop means now to be described.

The stop means comprises a U shaped frame 23, pivotally mounted in the typewriter case or frame by an axle 24 of frame 23, and having its ends connected by a cross bar or block 25 extending across and under all the key bars. At such points of the cross bar 25 as are under numeral (not letter) key bars 20N the cross bar 25 is notched, as at 26, so that cross bar 25 blocks only letter key bars 20L and not numeral keys bars 20N. At such points, however, there are pivotally mounted on frame 23, as by axle 24, blocks 27 having portions 28 in notches 26, and having tails 29 forming armatures for numeral key bar release magnets 30, whereby, energizing of these magnets 30 moves the blocks 27 to free the numeral key bars 20N, while the remaining key bars (letter keys) 20L are still blocked by block 25, held in blocking position by a key bar blocking magnet 31, which overcomes the bias of unblocking spring 32.

There is but one key bar blocking magnet 31, one frame 23, one block 25, ten blocks 27, and ten numeral key bar release magnets 30.

Energizing of blocking magnet 31 moves frame 23, block 25, and blocks 27 to blocking position. Energizing of a magnet 30 releases the particular numeral key bar 20N controlled by it. Deenergizing of magnet 31 releases all key bars 20. As shown in Fig. 5, each numeral key bar 20N has a lug 35 for engaging a cross bar 36 extending across and under all the numeral key bars, and pivotally mounted at 37 and normally biased upwardly by a spring 38, and thus causing the cross bar 36 to move down and close the switch 39 which is shown open, both in Figures 2 and 5, for purposes later to be described.

Fig. 8 shows a line spacing or platen advance means in the form of a key bar 40 which when moved down rotates the platen one line or row, through a ratchet mechanism, not shown. For the purposes of this application, the line spacing or platen advance key bar 40 is illustrated as pivotally connected at 41 to a plunger 42 of a line spacing or platen advance magnet 43 which when energized will pull down the plunger 42 and thus operate the platen advance key bar 40 and thus advance the line spacing or platen and the account card thereon one line or row. If it happens to be the hundreds line or row of the account punchings of the account card that happens to be in register with the account card reader of Fig. 3, the energizing of the line spacing or platen advance magnet 43 would cause the platen and the account card to move one row or line and to present the tens punching of the account card to the reader of Fig. 3.

Fig. 9 shows a type bar 50 pivotally mounted at 51 and adapted to be moved clockwise on its pivot when a type key is pressed down, so that its type face 52 engages an account card on the platen 53. In order to prevent the type bars from striking the platen or account card during the operation of the improvements herein disclosed, a stop means for the bars 50 is provided. Such stop means includes a type bar block 54 pivotally mounted at 55 and pivotally connected at 56 to a link 57 pivotally connected at 58 to an armature 59 pivoted at 60 and normally biased clockwise by a spring 61 but adapted to be biased in the opposite direction by a type-bar-blocking magnet 62 which, when energized, pulls down the armature 59, and link 57, and moves the block 54 into the type bar blocking position shown. When magnet 62 is deenergized, as is normally the case, spring 61 biases the block 54 out of the blocking position shown. When block 54 is in the blocking position shown, it prevents the type faces 52 of the type bars 50 from striking either the platen or an account card or other card or sheet on the platen.

*Operation*

The operation of the improvements herein disclosed will now be described. An account card 10 is mounted on the paper or card table of the typewriter in the usual manner. When so mounted, its punchings 11 will be positioned within a properly positioned reader 14.

Reader contacts X and Z of reader section A will engage the contacts of reader section B to close two circuits. One will energize a signal in the form of a lamp 70. The other circuit will energize the type-bar-blocking magnet 62 of Fig. 9 so as to block the type bars from further movement, and will also energize the type key bar blocking magnet 31 of Fig. 5 to cause the typewriter key bars to be blocked against being depressed.

At the same time, reader contacts #1 will engage through the punching #1 in the hundreds row of the account card and this will close a circuit to the numeral key bar releasing magnet 30 corresponding to #1 of the ten magnets 30 whereupon numeral key bar for #1 is released and freed so that this key bar may be operated.

When the operator presses down the #1 key, the switch 39 of Figure 5 is closed so as to close a circuit to a time delay relay 71 which closes a switch 72 in a circuit for the line spacing or platen advance magnet 43 of Fig. 8, whereupon the platen is advanced one or rotated one line or row to present the tens row or line of the punchings 11 of card 10 to the reader 14 of Fig. 3.

When the hundreds line punchings of the account card was in the reader 14, only #1 numeral key bar could be depressed; all other key bars remain blocked. Not until the operator pressed down the #1 numeral key bar was it possible for the line spacing magnet to operate for rotating the platen to present the tens row or line of the card to the reader for sensing or reading.

The account card and the platen are moved by the line spacing means, when proper numeral keys are depressed, so that the tens row or line punchings and then the units row or line punchings are presented to the reader successively, the operator each time pressing down a numeral key, first #6, and then #3. After the operator has pressed down successively numeral keys #1, #6, and #3, corresponding to the account number punchings #163 on the account card 10, the platen has been rotated and the account card has been advanced through the reader 14 so as to present no punchings whatever to the reader and this opens all contacts of the reader, including contacts X and Z which had remained closed during the reading of the hundreds, tens, and units punchings of the account card.

This opens all circuits. The circuit to the key bar blocking magnet 31 is open and the key bar block is released. The circuit to the line spacing or platen advance magnet 43 is open and platen advance or rotation is no longer controlled by the circuit but is subject only to manual control in the usual manner. The circuit to the type bar blocking magnet 62 is open so as to release the type bars 50 and permit them to move to the platen or the inserted account card in the usual manner.

If, during the reading of the account card punchings the operator touched a type key other than the one supposed to be touched, she would find that key bar locked against being depressed.

It will be observed that in the construction herein disclosed, nothing prevents the operator from moving the account card manually into, through, past, and out of reading position without at any time manipulating any of the type keys. Thus, if an operator wishes to avoid the checking provided by the construction herein disclosed, she is free to do so. However, if the operator wishes to make certain that she has selected the account cards properly she may use the checking aparatus herein disclosed to check her selection. She will insert an account card that she has selected and will thereupon successively press down the keys denoting the account shown on the original item from which she is posting. If the type key numbers she presses down correspond to those of the account card she has inserted, then the checking operation will be completed and she can thereupon proceed to the typing and posting operation. If she has pressed the incorrect numeral key, or if she has pressed down the correct numeral keys but has inserted the incorrect account card, she is warned of that fact by her inability to press down certain ones of the numeral keys.

The signal 70 is energized during all the time the account card is in reading position and this will indicate to the operator that the account card punchings are being read by the reader 14 of Fig. 3. When the reading is completed, the signal 70 will be deenergized and the machine will be normal.

It will be observed that merely upon the insertion of an account card into the reader 14, the key bar blocking means 25 will be moved to key bar blocking position for all type key bars and that only individual ones of the type key bars will be unblocked after pressing down of individual ones of the numeral keys, corresponding to the reading of the punchings in the reader 14.

It will also be observed that though the platen and account card can be advanced manually, the automatic step by step or row by row advance of the account card past successive reading positions of its punchings is responsive to successive depressions of proper numeral keys, corresponding to the reading of the account card punchings in reader 14.

It will also be observed that advance of the card to and past reading position and into typing position automatically releases all of the key blocks and all of the key bars, and also releases the type-bar block, and also deenergizes the signal 70.

Now having described the construction herein disclosed, reference should be had to the claim which follows.

I claim:

In a posting machine having a plurality of manually controlled key bars, means for receiving an account card inserted therein, said card having a control designation and an account designation, means for reading said account designation of said card, a plurality of means for blocking said key bars, means for moving all of said blocking means into blocking position, means for moving all of said blocking means out of blocking position, means controlled by the control designation of said card, upon insertion of said card into said receiving means, for actuating said means for moving all of said blocking means into blocking position, means for releasing individual ones of said blocking means and thus for releasing individual ones of said key bars, means controlled by said reading means, upon reading said account designation of said card, for selecting and actuating the particular one of said releasing means that corresponds to said account designation and thereby releasing the corresponding one of said key bars, means for advancing the card, and means responsive to actuation of the released key bar for actuating said advancing means to advance the control designation of said card out of cooperative relation with the means controlled thereby, whereupon the blocking means is freed to be moved out of blocking position by said means for moving all of said blocking means out of blocking position.

CARLOS WITTENMYER.